May 17, 1927.
A. BITZEL
1,629,064
TEMPERATURE, PRESSURE, OR FLOW REGULATING DEVICE
Filed May 28, 1925     3 Sheets-Sheet 1
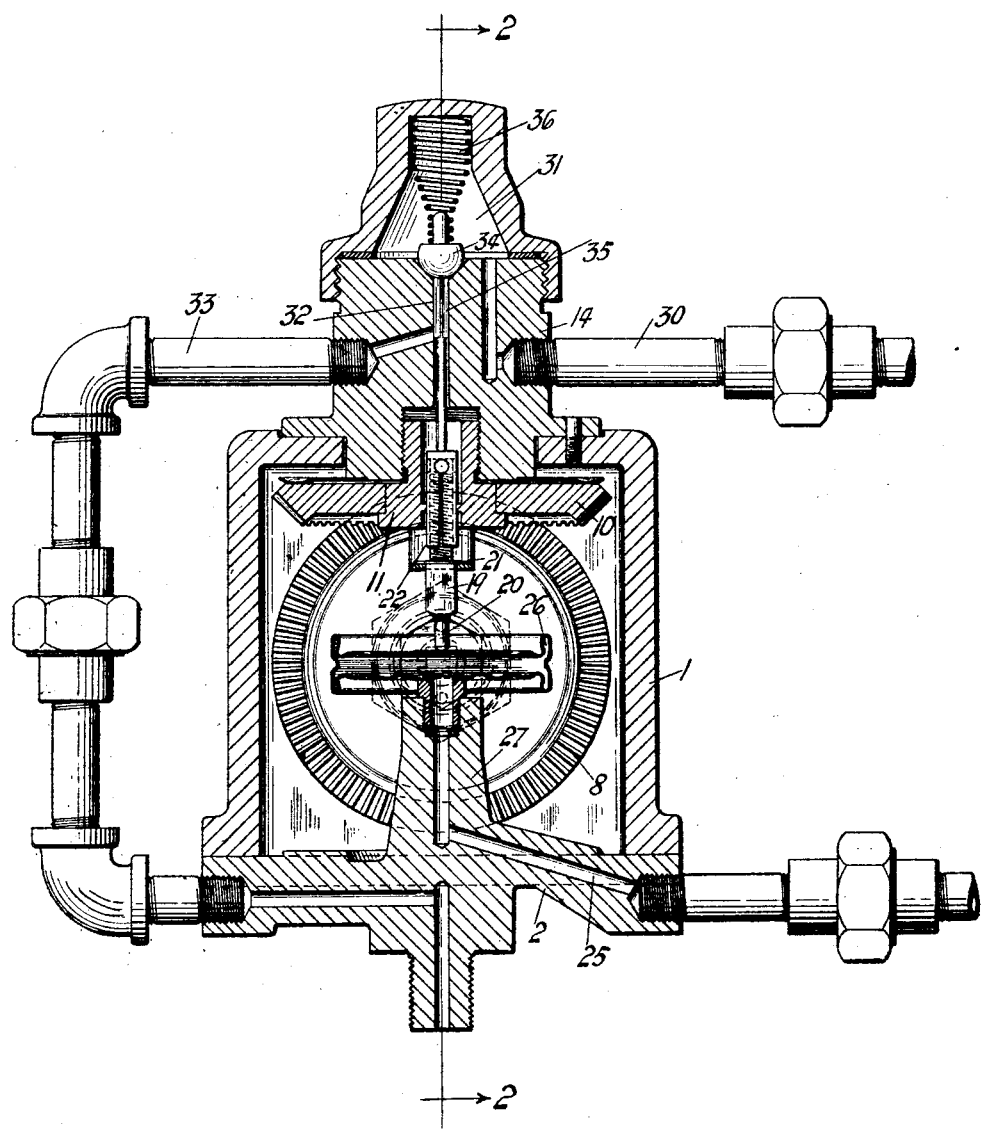
Fig.-1.
INVENTOR.
ANDREW BITZEL.
BY 
ATTORNEY.

INVENTOR.
ANDREW BITZEL.
BY
ATTORNEY.

May 17, 1927. 1,629,064
A. BITZEL
TEMPERATURE, PRESSURE, OR FLOW REGULATING DEVICE
Filed May 28, 1925 3 Sheets-Sheet 3
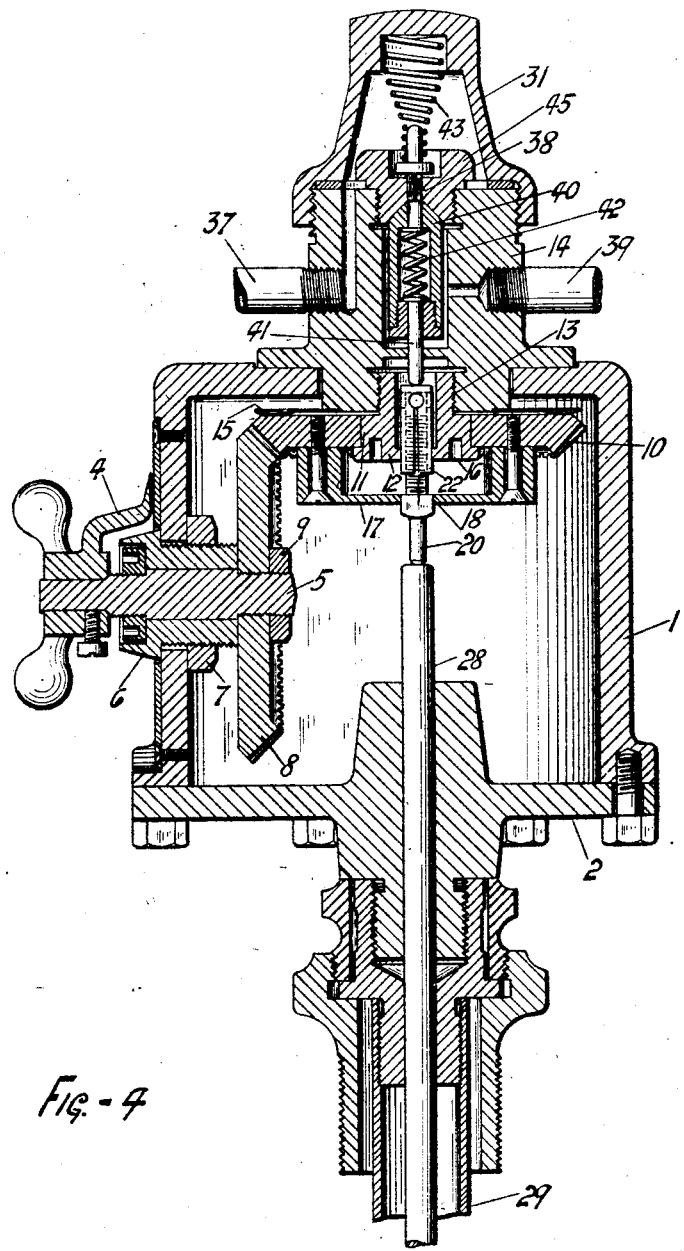
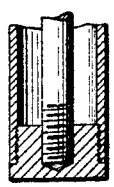
FIG.-4
INVENTOR.
ANDREW BITZEL
ATTORNEY.

Patented May 17, 1927.

1,629,004

UNITED STATES PATENT OFFICE.

ANDREW BITZEL, OF AKRON, OHIO, ASSIGNOR TO THE THERMO INSTRUMENT COMPANY, OF AKRON, OHIO, A CORPORATION OF OHIO.

TEMPERATURE, PRESSURE, OR FLOW REGULATING DEVICE.

Application filed May 28, 1925. Serial No. 33,582.

This invention relates to temperature or pressure controlled mechanisms which may be used in many arts and industries and in a variety of ways, the particular embodiments of the invention herein shown being adapted to control, through air pressure, any desired pressure system or heating device.

The invention relates to a heat or pressure responsive controlling unit and has for it object the provision of simple and easily operated mechanism for securing an accurate adjustment of the various working parts. Other objects and advantages will be apparent from the description of the parts and their operation, it being necessary merely, to note that two forms of the invention are shown, but other modifications may be suggested thereby to those skilled in the art, and such devices as fall within the scope of the invention as set forth in the appended claims are intended to be covered herein.

In the drawings:

Figure 1 is a cross-sectional view of one form of the invention, particularly adapted for heat or pressure control or the controlling of the flow of fluids generally, such as draft control, etc., from a remote source.

Figure 4 is a sectional view of a form of controller for near control.

Figure 2:
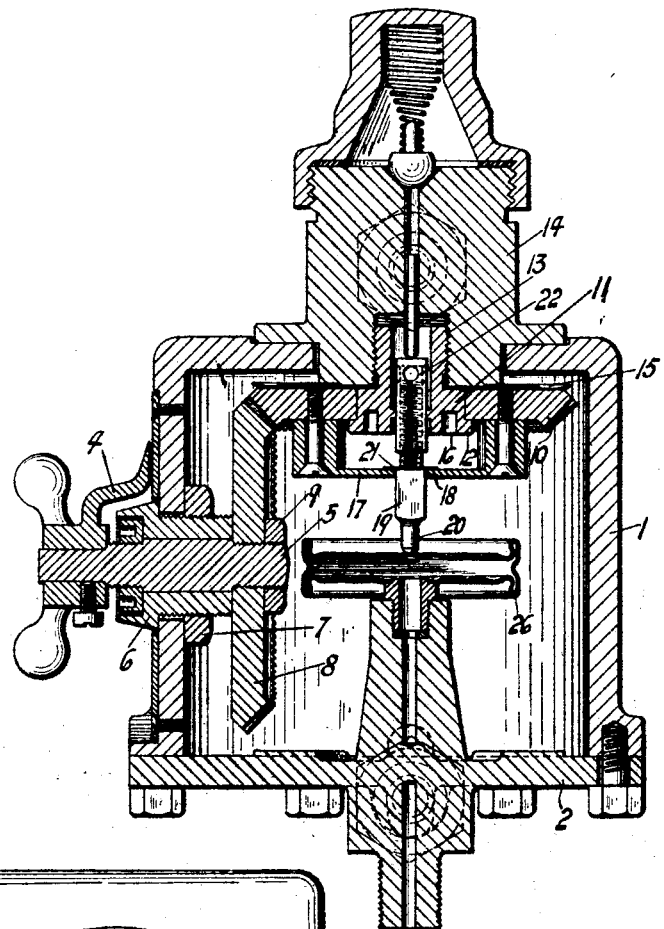
Figure 2 is a section on the line 2—2 of Figure 1.
Figure 3:
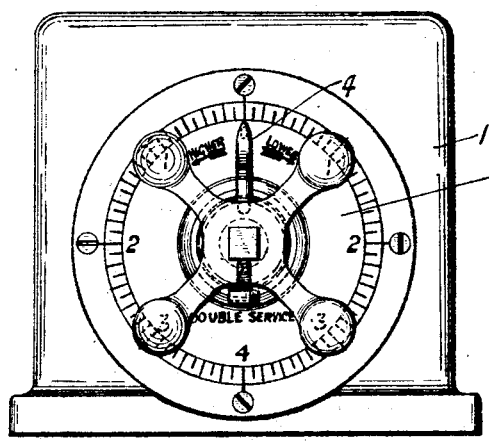
Figure 3 is a front elevation of the controller dial.

Each device shown herein comprises a housing 1 closed at its lower side by a plate 2. On the front of each housing is secured an indicator plate 3 over which is arranged to travel a pointer 4 secured to a rotary shaft 5 mounted in the housing by means of a hub 6 and nut 7. The inner end of the shaft carries a bevel gear 8 clamped in position by a nut 9. The bevel gear 8 meshes with a bevel gear 10 which is rotatably mounted upon a bearing 11 and rests upon a flange 12 upon the bearing. The bearing 11 is screw-threaded and enters a recess 13 in a block 14 secured in an opening in the upper side of the housing 1. A flat spring plate 15 is located between the gear 10 and the lower side of the block 14.

The bearing piece 11 is stationary and may be screwed in the block by any suitable spanner entering the holes 16.

In both forms of the invention the outer face of the bevel gear 10 carries a bridge piece 17 which is formed with a non-circular opening 18 in which is loosely seated the similarly shaped shank 19 of a pin 20 which rests upon a suitable heat responsive device, a collar 21 supporting the pin upon the bridge 17. The upper end of the pin 20 is screw-threaded and is received within a split plug 22 which is non-circular in cross-section and is received within a similarly shaped opening in the center of bearing piece 11.

By the construction shown, a quick and accurate adjustment of the various elements of the device may be obtained, the elements which have just been described serving to transmit the variations in temperature or pressure of the heater or other device to the regulating mechanism for the heater.

In the form of the invention shown in Figures 1 and 2, the apparatus is designed for use to regulate pressure in a system connected thereto through the passageway 25 in the cover 2 and thence to an expansible diaphragm 26 mounted on a post 27 on the cover 2, the pin 20 resting upon and being raised and lowered by the expansion and contraction of the diaphragm. This form of the invention is adapted by suitable modifications for remote temperature control by connecting a capillary tube leading from a heat-responsive bulb to passageway 25.

In the form of the invention shown in Figure 4 where the instrument is shown particularly for controlling temperature and can be mounted directly upon the heater, the cover plate 2 has slidably mounted therein a rod 28, the lower end of which is connected to an expansible tube 29 which projects into the heating chamber and the upper end of which is secured to the plate 2 in any suitable manner. As the tube 29 expands the pin 20 is permitted to descend and as it contracts the pin is raised.

In both forms of the invention the fluid delivered from any source to the chamber, the pressure or temperature of which is to be controlled, is, in turn, controlled by compressed air, the passage of air being governed by a valve mechanism operated by the heat responsive element through the pin 20 and connected parts.

In the form shown in Figures 1 and 2, the air enters the device through the passage 30 and into the interior of the cap 31 which is screwed upon the block 14 from whence it passes through the bore 32 in the block 14 to the outlet 33. A ball-valve 34 controls the passageway 32, this valve being carried upon a flattened pin 35 in the passageway 32 which extends downward to and rests upon the plug 22. A spring 36 is located between the cap and ball valve.

In the form shown in Figure 4, air enters the passage 37 and goes to the interior of the cap 31 whence it enters the passageway 38 in the screw-threaded bushing 45 and leaves through passage 39. The movable valve 40 is located in the passageway 38 and is actuated by the pin 41 from the pin 20. A spring 42 connects the pin 41 with the valve 40 and a spring 43 bears upon the valve from above. Except for the reverse travel of air, due to the difference in the character of the heat or pressure responsive elements, the operation of the devices are similar.

It will be observed that the parts 20 and 22 constitute a two-part pin for transmitting the variations of the heat responsive element to the valve and the parts 10 and 11 constitute a two-part adjusting device having relative rotary movement to effect elongation or shortening of the pin 20—22. It will also be noted that the cap 31 can be removed in order to obtain access to the air valve for inspection and cleaning. This can be accomplished in either form of the device without disturbing the setting of the controller; in the form shown in Figure 2, by removing the cap alone, and in the form shown in Figure 4, by removing the cap and the bushing 45. This is a considerable advance over devices of this nature of the prior art, in which the entire arrangement had to be demounted to inspect or clean the air valve.

What is claimed is:

1. In a heat, pressure or flow regulating and responsive device, a housing, an actuating element responsive to heat or pressure in a chamber, an air passageway, a valve therein, a pin resting upon the heat responsive element, a rotatable gear, a bridge piece upon the gear, said bridge piece having a non-rotatable connection with said pin, a screw-threaded plug located in the housing and in which said pin is received, and means to hold said plug non-rotatably, the valve being operated through the medium of the said pin and plug.

2. In a heat, pressure or flow regulating system, a heat or pressure responsive element and an air valve, and means to transmit the variations of the former to the latter, comprising a two-part pin resting upon the heat responsive element and operable to open and close the valve, the two parts of the pin having screw-threaded connection and adjusting devices for the pin rotatable with respect to one another and each having a non-rotatable connection with a part of the pin.

3. In a heat, pressure or flow regulating system, a heat or pressure responsive element and an air valve, and means to transmit the variations of the former to the latter, comprising a pin and a plug having screw-threaded connection with one another, a stationary bearing having non-rotative connection with the plug and a gear upon the bearing having non-rotative connection with the pin.

4. In a heat, pressure or flow regulating system, a heat or pressure responsive element, and an air valve, and means to transmit the variations of the former to the latter, comprising a pin in two parts having screw-threaded connections with one another, each part of the pin having a non-circular portion, a stationary bearing for the non-circular portion of one part of the pin, and a rotatable element having an opening for the non-circular portion of the other part of the pin.

5. In a temperature, pressure or flow regulating device, a housing, a heat or pressure responsive element carried by the housing, an adjustable pin resting upon the heat responsive element, mechanism for adjusting the length of the pin located within the housing, a single-seated air control valve operated by the pin, the seat for the valve being on a member projecting from the housing, and a cap over the air valve and removable therefrom whereby access may be had to the air valve without disturbing the adjustment of the pin.

6. In a temperature, pressure or flow regulating device, a housing, a heat or pressure responsive element, an adjustable pin, adjusting mechanism located within the housing, and an air control valve controlled by the pin located exteriorly of the housing, the seat for the valve being substantially on the outer surface of a member extending beyond the housing.

7. In a temperature, pressure or flow regulating device, a housing, a heat or pressure responsive element, an adjustable pin, adjusting mechanism located within the housing, an air control valve controlled by the pin located exteriorly of the housing, the seat for the valve being substantially on the outer surface of a member of the housing, and means to enclose said air valve removable therefrom without disturbing the adjustment of the pin, the valve being readily removable from the seat when the enclosing means is removed.

8. In a temperature, pressure or flow regulating device, a housing, a block secured to one side of the housing, a heat or pressure responsive device located within the housing, an air valve within the block, the seat for the valve being on the exterior of the block exteriorly of the housing, a cover plate for the block removable therefrom to expose the air valve, and means to operate the air valve from the responsive device.

9. In a temperature, pressure or flow regulating device, a housing, a heat or pressure responsive element in said housing, a block secured to one side of the housing having an air passageway therethrough, an air valve in said passageway, the seat for the valve being on the exterior of the block exteriorly of the housing, an adjustable connection for transmitting movement of the responsive element to the air valve, adjusting mechanism for the connection located within the housing, and a cover upon the block removable to expose the air valve without disturbing the adjustment of the connection.

ANDREW BITZEL.